United States Patent
Ripsher et al.

(10) Patent No.: US 9,542,494 B2
(45) Date of Patent: Jan. 10, 2017

(54) PROACTIVE DELIVERY OF RELATED TASKS FOR IDENTIFIED ENTITIES

(75) Inventors: Lawrence Brian Ripsher, Seattle, WA (US); Severan Sylvain Jean-Michel Rault, Redmond, WA (US); Gary Voronel, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/270,250

(22) Filed: Oct. 11, 2011

(65) Prior Publication Data

US 2013/0090956 A1    Apr. 11, 2013

(51) Int. Cl.
G06Q 10/00    (2012.01)
G06F 7/00     (2006.01)
G06F 17/30    (2006.01)

(52) U.S. Cl.
CPC .................. *G06F 17/30867* (2013.01)

(58) Field of Classification Search
CPC ............... G06F 17/30864; G06F 17/30867; G06Q 30/02; G06Q 30/0251
(Continued)

(56) References Cited

U.S. PATENT DOCUMENTS 6,633,867 B1 * 10/2003 Kraft ................. G06F 17/30867
                                                 705/26.1
6,859,214 B2    2/2005 Williams et al.
(Continued)

FOREIGN PATENT DOCUMENTS

JP    2009224819 A    10/2009
JP    2011076566 A     4/2011
(Continued)

OTHER PUBLICATIONS

Santos, et al., "Voting for Related Entities", Retrieved at <<http://terrierteam.dcs.gla.ac.uk/publications/santos2010riao.pdf>>, In the Proceedings of 9th International RIAO Conference in Paris, Apr. 28-30, 2010, p. 8.
(Continued)

*Primary Examiner* — Brian Epstein
(74) *Attorney, Agent, or Firm* — Steven Spellman; Tom Wong; Micky Minhas

(57) ABSTRACT

A search engine database is utilized to identify "entities", or things for which there exists associated discrete, objective information. For hosted information that is independently available, the entity detector independently accesses such information and identifies entities. For information that has defined potential entities, such as entertainment or lifestyle information such defined potential entities are provided to the entity detector to verify, with reference to the search engine database, whether they are entities. Once entities have been identified, a related task generator, with reference to the search engine database, identifies tasks that are related to the identified entities. Such tasks include informational tasks, economic tasks, time-sensitive and location-sensitive tasks. The identified entities and related tasks are provided to applications, with metadata quantifying confidence, relationship, importance, location and time sensitivity, and the like, thereby enabling those applications to proactively provide selects ones of that information to users.

20 Claims, 6 Drawing Sheets

(58) Field of Classification Search
 USPC .......................................................... 705/5
 See application file for complete search history.

(56) References Cited

U.S. PATENT DOCUMENTS

| | | | |
|---|---|---|---|
| 7,430,561 | B2 | 9/2008 | Bailey et al. |
| 7,822,762 | B2 | 10/2010 | Payne et al. |
| 7,827,476 | B1 | 11/2010 | Roberts et al. |
| 2005/0232131 | A1* | 10/2005 | Bulleit .................. G06Q 30/02 370/200 |
| 2006/0004640 | A1 | 1/2006 | Swierczek |
| 2006/0069504 | A1 | 3/2006 | Bradley et al. |
| 2006/0106846 | A1 | 5/2006 | Schulz et al. |
| 2007/0022380 | A1 | 1/2007 | Swartz et al. |
| 2007/0234210 | A1 | 10/2007 | Bukovec et al. |
| 2008/0046332 | A1* | 2/2008 | Rotholtz ........................ 705/26 |
| 2008/0098026 | A1* | 4/2008 | Kraft et al. .................. 707/102 |
| 2008/0183691 | A1* | 7/2008 | Kwok et al. ...................... 707/5 |
| 2008/0244428 | A1 | 10/2008 | Fain |
| 2008/0294603 | A1 | 11/2008 | Ranjan et al. |
| 2008/0306908 | A1 | 12/2008 | Agrawal et al. |
| 2009/0005973 | A1 | 1/2009 | Salo et al. |
| 2009/0089317 | A1 | 4/2009 | Ford et al. |
| 2009/0144234 | A1 | 6/2009 | Sharif et al. |
| 2009/0144609 | A1* | 6/2009 | Liang et al. .................. 715/230 |
| 2009/0157729 | A1 | 6/2009 | Herlocker et al. |
| 2009/0248674 | A1 | 10/2009 | Suzuki et al. |
| 2009/0276408 | A1 | 11/2009 | Auerbach et al. |
| 2010/0030734 | A1* | 2/2010 | Chunilal .......... G06F 17/30867 707/770 |
| 2010/0057590 | A1 | 3/2010 | Wesby |
| 2010/0082604 | A1 | 4/2010 | Gutt et al. |
| 2010/0121861 | A1 | 5/2010 | Marsden et al. |
| 2010/0125604 | A1 | 5/2010 | Martinez et al. |
| 2010/0332324 | A1 | 12/2010 | Khosravy et al. |
| 2011/0035406 | A1 | 2/2011 | Petrou et al. |
| 2011/0072033 | A1* | 3/2011 | White ................. G06F 17/3064 707/768 |
| 2011/0131235 | A1 | 6/2011 | Petrou et al. |
| 2011/0137989 | A1* | 6/2011 | Kiciman ................ G06Q 30/02 709/204 |
| 2011/0264526 | A1 | 10/2011 | Mital et al. |
| 2011/0264673 | A1 | 10/2011 | White et al. |
| 2011/0302521 | A1 | 12/2011 | Jiang et al. |
| 2012/0117058 | A1 | 5/2012 | Rubinstein et al. |
| 2012/0124061 | A1 | 5/2012 | Macbeth et al. |
| 2012/0144281 | A1 | 6/2012 | Schechter et al. |
| 2012/0284247 | A1 | 11/2012 | Jiang et al. |
| 2013/0091463 | A1 | 4/2013 | Nordstrom et al. |
| 2014/0101600 | A1 | 4/2014 | Macbeth et al. |

FOREIGN PATENT DOCUMENTS

| | | |
|---|---|---|
| KR | 10-1090819 B1 | 12/2011 |
| WO | 0146870 A1 | 6/2001 |
| WO | 2005031700 A1 | 4/2005 |
| WO | 2007032142 A1 | 3/2007 |

OTHER PUBLICATIONS

Demartini, et al., "An Architecture for Finding Entities on the Web", Retrieved at <<http://ieeexplore.ieee.org/stamp/stamp.jsp?tp=&arnumber=5341521>>, In the Proceedings of Latin American Web Congress, Nov. 9-11, 2009, pp. 230-237.

Urbansky, et al., "Entity Extraction from the Web with WebKnox", Retrieved at <<http://www.seg.rmit.edu.au/research/download.php?manuscript=397>>, Advances in Intelligent Web Mastering2, 2009, pp. 209-218.

"Creating new filters for tasks", Retrieved at <<http://publib.boulder.ibm.com/infocenter/wpdoc/v6r1/index.jsp?topic=/com.ibm.wp.ent.doc_v6101/bizproc/bpi_customize_taskfilters_new.html>>, Retrieved Date: Feb. 23, 2012, p. 2.

"International Search Report", Mailed Date: Mar. 4, 2013, Application No. PCT/US2012/059624, Filed Date: Oct. 10, 2012, p. 10.

"Supplementary Search Report Issued in European Patent Application No. 12839885.6", Mailed Date: May 12, 2015, 10 Pages.

Panniello, Umberto et al., "Context-Aware Recommender Systems: A Comparison of Three Approaches", DART@ AI*IA, Sep. 17, 2011.

Vo, Chuong Cong et al., "Towards Context-Aware Task Recommendation", 2009 Joint Conferences on Pervasive Computing (JCPC), pp. 289-292, Dec. 3, 2009.

Office Action Issued in Japanese Patent Application No. 2014-535826, Mailed Date: Jul. 28, 2016, 12 Pages.

* cited by examiner

PROACTIVE DELIVERY OF RELATED TASKS FOR IDENTIFIED ENTITIES

BACKGROUND

As network communications among multiple computing devices have become ubiquitous, the quantity of information available via such network communications has increased exponentially. For example, the ubiquitous Internet and World Wide Web comprise information sourced by a vast array of entities throughout the world, including corporations, universities, individuals and the like. Such information is often marked, or "tagged", in such a manner that it can be found, identified and indexed by services known as "search engines". Even information that is not optimized for search engine indexing can still be located by services, associated with search engines, which seek out information available through network communications with other computing devices and enable a search engine to index such information for subsequent retrieval.

Due to the sheer volume of information available to computing devices through network communications with other computing devices, increasingly users turn to search engines to find the information they seek. Search engines enable users to search for any topic and receive, from this vast volume of information, identifications of specific information that is responsive to, or associated with, the users' queries, often presented in order of relevance or importance to the user. To sort through the vast amounts of information that is available, and timely provide useful responses to users' queries, search engines employ a myriad of mechanisms to optimize the identification and retrieval of responsive and associated information.

Unfortunately, search engines are, by definition, reactive entities in that they only provide information in response to an initial action seeking such information in the first place. Simply put, if a user does not realize that they are lacking specific information that may be of benefit to them, then all of the information that is available through the search engine will remain unused by such a user, and, thereby will not be of any use to that user.

SUMMARY

In one embodiment, application programs can query a service, which has access to a search engine database, in order to obtain from such a service a listing of tasks related to entities in the information that such application programs are presenting to a user. Such entities can include products, organizations, individuals, places, activities and the like. The related tasks can be identified with reference to the search engine database. The related tasks can be presented proactively to the user, thereby providing the user with relevant information in a proactive manner and without requiring the user to first be aware that they desire such information.

In another embodiment, for hosted information, application programs can provide identification of such hosted information to the service that has access to the search engine database, thereby enabling such a service to first detect entities in the hosted information, and then identify those entities to the application programs, as well as enabling such a service to provide tasks related to those entities.

In a further embodiment, for information that has defined potential entities, such as entertainment information or lifestyle information, application programs can provide the potential entities to the service that has access to the search engine database, and can receive therefrom an indication of which of the potential entities are, in fact, entities for which related tasks can be identified. The application programs can further receive those related tasks.

In a still further embodiment, identified entities and tasks associated with those entities can be provided with metadata to enable application programs to determine whether, and to what extent, such identified entities and associated tasks are presented to a user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
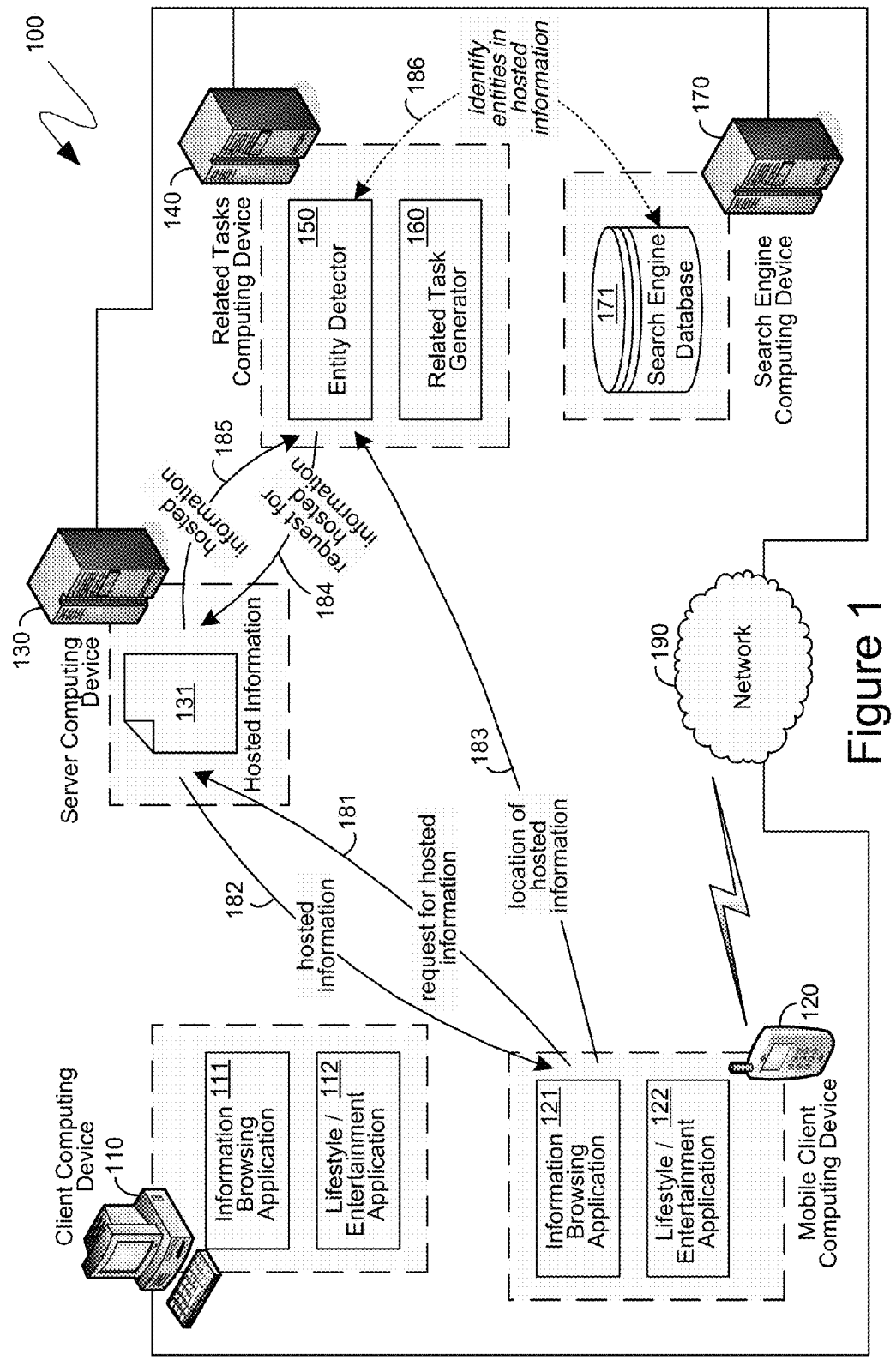
FIG. 1 is a block diagram of an exemplary network of computing devices exchanging communications for identifying entities in hosted information.

The following descriptions are directed to the proactive delivery of related tasks for identified entities. A search engine database, comprising the information collected and indexed by a search engine for more efficient presentation of search results to queries, can be utilized to identify "entities", or things for which there exist associated discrete, objective information available through network communications. For hosted information that is independently available to both an information browsing application and an entity detector, the entity detector can independently access such hosted information and identify any entities therein, again with reference to a search engine database. The identified entities can then be provided to the information browsing application. For information that has defined potential entities, such as entertainment information or lifestyle information, appropriate applications can provide such defined potential entities to the entity detector to verify, with reference to the search engine database, whether they are, in fact, entities. Those potential entities that have been verified as actual entities can then be provided back to the entertainment or lifestyle application. Additionally, once entities have been identified, a related task generator can, again, with reference to the search engine database, identify tasks that are related to the identified entities. Such tasks can include informational tasks, economic tasks, time-sensitive tasks, location-sensitive tasks, and the like. The related tasks can be provided to the information browsing application or the entertainment or lifestyle application to enable those applications to proactively provide such related tasks to their users. Additionally, the related tasks can be provided with metadata, including metadata quantifying confidence, relationship, importance, location and time sensitivity, and other like metadata, in order to better enable the receiving applications to decide which related tasks, if any, to present to the user, as well as in what order to present those related tasks.

For purposes of illustration, the techniques described herein make reference to existing and known networking infrastructure, such as the ubiquitous Internet and World Wide Web (WWW). Also for purposes of illustration, the techniques described herein make reference to existing and known protocols and languages, such as the ubiquitous HyperText Transfer Protocol (HTTP) and the equally ubiquitous HyperText Markup Language (HTML). Such references, however, are strictly exemplary and are not intended to limit the mechanisms described to the specific examples provided. Indeed, the techniques described are applicable to any exchange of data, through any means, where an existing database can be leveraged to proactively provide related information to users accessing data.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Turning to FIG. 1, an exemplary system 100 is shown, comprising a client computing device 110, and a mobile client computing device 120 that are both communicationally coupled to a network 190 that also comprises a server computing device 130, a related tasks computing device 140, and a search engine computing device 170. Although illustrated as separate, individual computing devices, the functionality described below with reference to the server computing device 130, the related tasks computing device 140 and the search engine computing device 170 could be performed by a single computing device or spread across many different physical, or virtual, computing devices. For example, in one embodiment, the functionality described below as being provided by the related tasks computing device 140 can be provided by the same computing device, or collection of computing devices, as the functionality described below as being provided by the search engine computing device 170.

Both the client computing device 110 and the mobile client computing device 120 are shown as comprising information browsing applications and lifestyle/entertainment applications to illustrate that the mechanisms described below are equally applicable to mobile computing devices, including laptop computing devices, tablet computing devices, smart phone computing devices, and other like mobile computing devices, as well as to the ubiquitous desktop computing devices. The client computing device 110 is shown as comprising an information browsing application 111 and the lifestyle/entertainment application 112. Similarly, the mobile client computing device 120 is illustrated as comprising an information browsing application 121 and a lifestyle/entertainment application 122. For purposes of the descriptions below, references to the information browsing application 111 executing on the client computing device 110 are intended to be equally applicable to the information browsing application 121 executing on the mobile client computing device 120, and vice versa. Similarly, for purposes of the descriptions below, references to the lifestyle/entertainment application 112 executing on the client computing device 110 are meant to be equally applicable to the lifestyle/entertainment application 122 executing on the mobile client computing device 120, and vice versa.

In one embodiment, the information browsing application 111, or the information browsing application 121, can be the ubiquitous web browser that can retrieve and display information in the form of websites that are hosted by web servers communicationally coupled to the network 190. However, as indicated previously, the mechanisms described below are not limited to World Wide Web-based environments. Thus, for example, in another embodiment, the information browsing application 111, and the information browsing application 121, can be other types of information browsing applications including, for example, e-book readers, universal document format readers, or even content creation applications, such as word processors, spreadsheets, presentation applications, and e-mail applications. As will be made evident from the descriptions below, if the information browsing applications 111 and 121 present information to a user, then that information can include entities and those applications can receive information regarding those entities, and regarding tasks that are identified as being related to those entities and can, should they be programmed to do so, present such an identification of at least some of those entities to their users, and can also present at least some of those identified related tasks to proactively provide information to their users that their users may not have been aware that they desired.

In one embodiment, information browsing applications, such as the information browsing applications 111 and 121, can access information from other computing devices that are communicationally coupled to the network 190, such as, for example, the hosted information 131 that is provided by the server computing device 130. Thus, as illustrated by the system 100 of FIG. 1, exemplarily, the information browsing application 121 can issue a request 181 for the hosted information 131 to the server computing device 130. The hosted information 131 can be provided to the information browsing application 121 via the reply 182, as illustrated. In one embodiment, the information browsing application 121 can, in addition to the request 181, which is directed to the server computing device 130, also issue another communication 183 that can be directed to a related tasks computing device 140, and the information browsing application 121 can thereby provide, to an entity detector 150 executing on the related tasks computing device 140, information regarding the location of the hosted information 131.

The entity detector 150 can, itself, independently issue a request 184, for the hosted information 131, to the server computing device 130. In response, the server computing device 130 can provide the hosted information 131, as illustrated by the communication 185, to the entity detector 150. The entity detector 150 can then communicate with the search engine computing device 170 which, as indicated previously, can either be a separate computing device, or can be part of the same computing device in which the entity detector 150 is executing, and can, thereby, access the search engine database 171 to identify entities in the hosted information 131, as illustrated by the action 186.

In one embodiment, the request 184 from the entity detector 150 to the server computing device 130 for the hosted information 131 can be triggered by the provision of the location of the hosted information by the information browsing application 121, as illustrated by the communication 183. In another embodiment, however, the request 184 can have been made previously such as, for example, when a search engine crawler, or other like process designated to retrieve information from the network 190 for the search engine database 171, came upon the hosted information 131. In such another embodiment, where the entity detector 150 can have already requested and received the host information 131, and can have already identified entities in the host information with reference to the search engine database 171, as illustrated by the action 186, the receipt of the location of the hosted information from the information browsing application 121, via the communication 183, can serve to trigger the provision of the identified entities, and related tasks, to the information browsing application 121 as will be described in further detail below.

As indicated by the action 186, the entity detector 150 can utilize the search engine database 171 to identify entities in the hosted information 131. An "entity", as utilized herein, means any thing about which there is discrete, objective information available via the search engine database. By way of example, and not limitation, entities include individuals, organizations, places, products, activities, websites, entertainment offerings, and the like. As one specific example, the hosted information 131 can be a webpage of a shoe company that displays some of the shoes manufactured by that shoe company. In such an example, each of the shoes can be found to be an entity by the entity detector 150 since the entity detector 150 can, when referencing the search engine database 171, identify discrete, objective information that is associated with each of the shoes. Stated differently, if a user were to search for one of those shoes, a search engine utilizing the search engine database 171 could provide results that include discrete, objective information associated with the shoes that were searched for, such as, for example, links to websites where those shoes can be purchased, links to webpages where those shoes are reviewed were discussed, and other like discrete, objective information. As a result, therefore, the entity detector 150 can identify those shoes as an entity in the webpage that, in this example, represents the hosted information 131.

Figure 2:
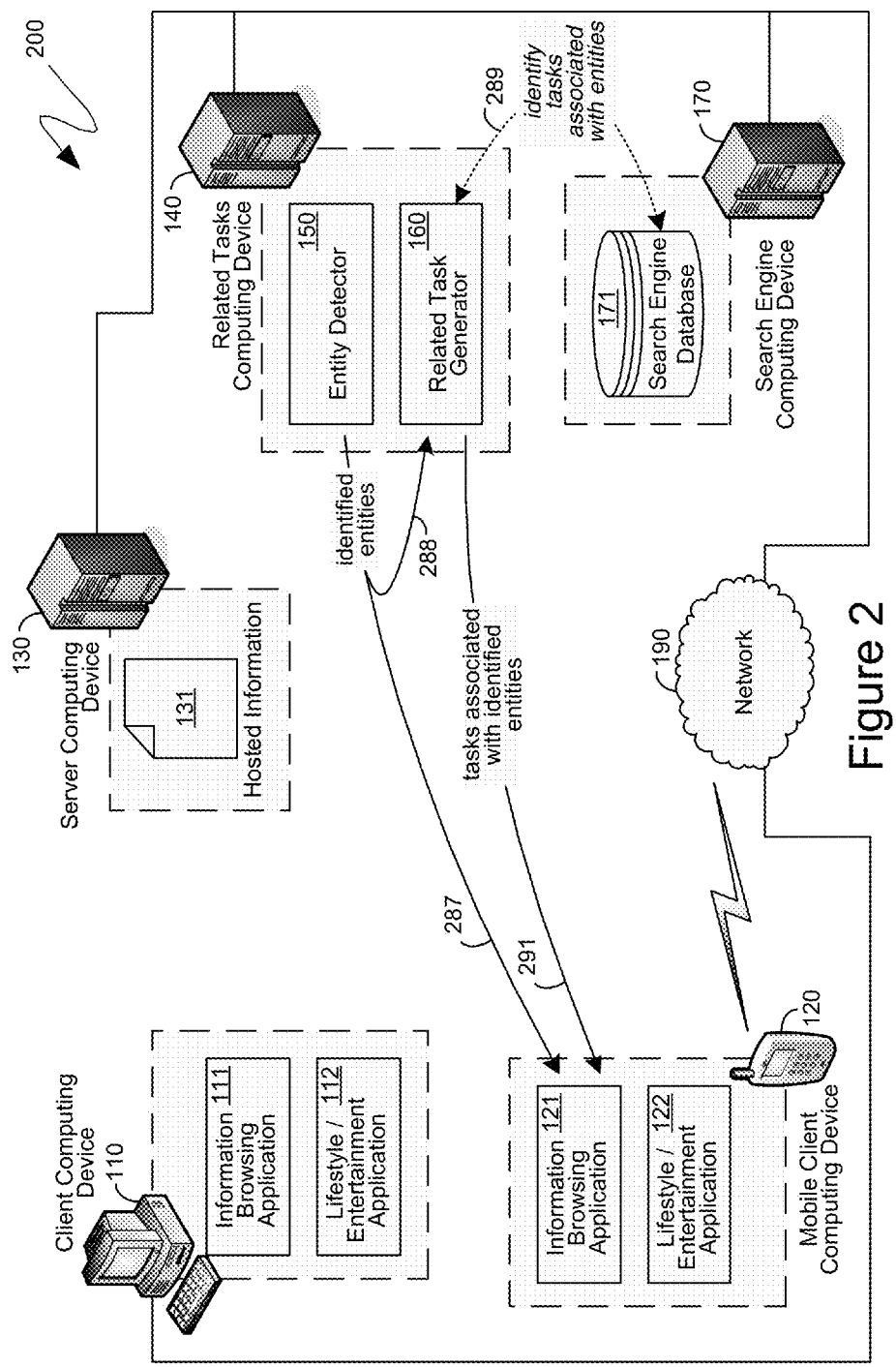
FIG. 2 is a block diagram of an exemplary network of computing devices exchanging communications for providing identified entities and associated tasks to an information browsing application.

Turning to FIG. 2, the system 200 shown therein illustrates the same computing devices as shown in the system 100 of FIG. 1. For consistency, the same numbers will be used throughout the Figures to refer to the same objects. Once the entity detector 150 has identified entities, such as in the manner described above, it can provide those identified entities to the related task generator 160, such as is illustrated by the communication 288. As will be recognized by those skilled in the art, while the communication 288 is illustrated as a communication between two different, and separate, processes, in one embodiment the entity detector 150 and the related task generator 160 can be part of the same executing process and, as such, the communication 288 can be nothing more than intra-process communication, including merely the passing of pointers to in-memory data.

The related task generator 160 can, upon receiving the identified entities via the communication 288, identify tasks that are associated with those entities by reference to the search engine database 171, as illustrated by the action 289. Subsequently, the related task generator 160 can provide the tasks, which it has identified as being associated with the identified entities, to the information browsing application 121, as illustrated by the communication 291. The information browsing application 121 can also receive the identified entities themselves, such as from the entity detector 150, via the communication 287. As will be recognized by those skilled in the art, the communications 287 and 291 can be combined into a single communication that identifies both entities and tasks associated with those entities.

In one embodiment, the related task generator 160 can identify tasks associated with entities by referencing the search engine database 171 in a manner analogous to that of a user utilizing that same search engine database, through a search engine, to search for tasks associated with specific entities. For example, returning to the above example in which an entity was a pair of shoes, a user's search for that pair of shoes, via a search engine that utilized the search engine database, could result in responsive information in the form of webpages that review the shoes, webpages that comprise consumer feedback on the shoes, and webpages through which those shoes can be purchased. Consequently, related tasks associated with that shoe entity can include the purchase of those shoes and the further researching of those shoes, such as by reading objective, and consumer, reviews.

When the tasks associated with the identified entities are provided to the information browsing application 121, such as via the communication 291, from the related task generator 160, the related task generator 160 can include metadata that can aid the information browsing application 121 in deciding which entities to present to the user and which related tasks to present with those entities. For example, such metadata can include an indication of the confidence with which an identified task is determined to be related to, or associated with, an entity. As another example such metadata can include an indication of the importance of a related task, or the time or location sensitivity of a related task, such as will be described in further detail below.

Upon receiving the identified entities and the tasks associated with those identified entities, such as via the communications 287 and 291, the information browsing application 121 can modify the presentation of the hosted information 131 in such a manner that the user is aware of at least some of those identified entities and at least some of the related tasks that are associated with those identified entities. For example, returning to the above example where the hosted information 131 was a webpage comprising information about shoes, the information browsing application 121 could visually indicate that it has additional information to present regarding the entities identified in that webpage, namely the individual shoes that are shown therein. If a user were to request that the information browsing application 121 present this additional information, the information browsing application 121 could present the related tasks that were identified as being associated with those identified entities. In one embodiment, a user could request such a presentation by directing a user action towards the visual indicator that is generated to identify an entity and to notify the user that additional related tasks can be presented. Once the user has directed an action towards this indicator, such as, for example, by clicking on it or hovering over it, the application can present, to the user, at least some of the related tasks that are associated with that entity. For example, the information browsing application 121 could present a pop-up or similar user interface element identifying websites at which the user could purchase those shoes and the prices of those shoes at those websites. As another example the information browsing application 121 could present a pop-up or similar user interface element that could contain snippets of reviews that can be found on other webpages of those shoes. In such a manner, information browsing application 121 can present additional information to each user, from the search engine database 171, in a proactive manner and before the user actively searches for such information, such as by using a search engine that itself would utilize the search engine database 171 to respond to the user's queries.

As another example, information browsing applications 111 and 121 can be e-book readers or other like information browsing applications. In such a context, the entity detector 150 can be provided an identification, such as with the previously described communication 183 that was shown in the system 100 of FIG. 1, of the e-book that the e-book reader is currently presenting to the user. The entity detector 150 can then, as described previously, identify entities within that e-book, with reference to the search engine database 171. Similarly, as also indicated previously, the related task generator 160 can identify tasks that are related to the identified entities, also with reference to the search engine database 171. The identified entities and the tasks related to those entities can be provided to the e-book reader, such as via the communications 287 and 291 that were described previously and are shown in the system 200 of FIG. 2. The information browsing application 121, in the form of an e-book reader in the present example, can then decide which, if any, of the identified entities to present to the user. For example, an e-book reader could decide that, to avoid unnecessarily distracting the user while they are reading their e-book, only a handful of identified entities are to be presented to such a user on any given page. Thus, in selecting which identified entities to present to the user, the e-book reader can utilize the metadata that was provided with the identified entities and, with the tasks associated with those identified entities, to select those identified entities that are most likely to be meaningful to the user. For example, entities that have tasks associated with them where those tasks exhibit a high degree of confidence, or correlation, between the tasks and the entities can be selected ahead of those entities whose related tasks do not exhibit such a high degree of confidence, or correlation.

As one specific example, an e-book reader could choose to notify the user, such as through an unobtrusive indicator, that a geographic location that was referenced in an e-book, such as Niagara Falls, can be an identified entity that can have tasks related to it. User selection of such an indicator can then present some of the related tasks, such as, for example a snippet from an online encyclopedia about Niagara Falls, or pictures that are tagged with the term "Niagara Falls". By contrast, an e-book reader could choose not to notify the user of an identified entity that is a character name, such as John Smith, because there may be a low correlation between tasks related to John Smith, as identified by the related task generator 160, and the character John Smith in the e-book that the e-book reader is currently presenting to the user.

While the above examples have been in the context of information that can be presented wholesale to the entity detector 150, such as, for example, the hosted information 131, other types of application programs that can execute on the client computing device 110, or the mobile client computing device 120, can utilize information that has defined potential entities, and such application programs need only provide those defined potential entities to the entity detector 150 to verify whether one or more of those potential identified entities is, in fact, an entity as would be identified by the entity detector 150.

Figure 3:
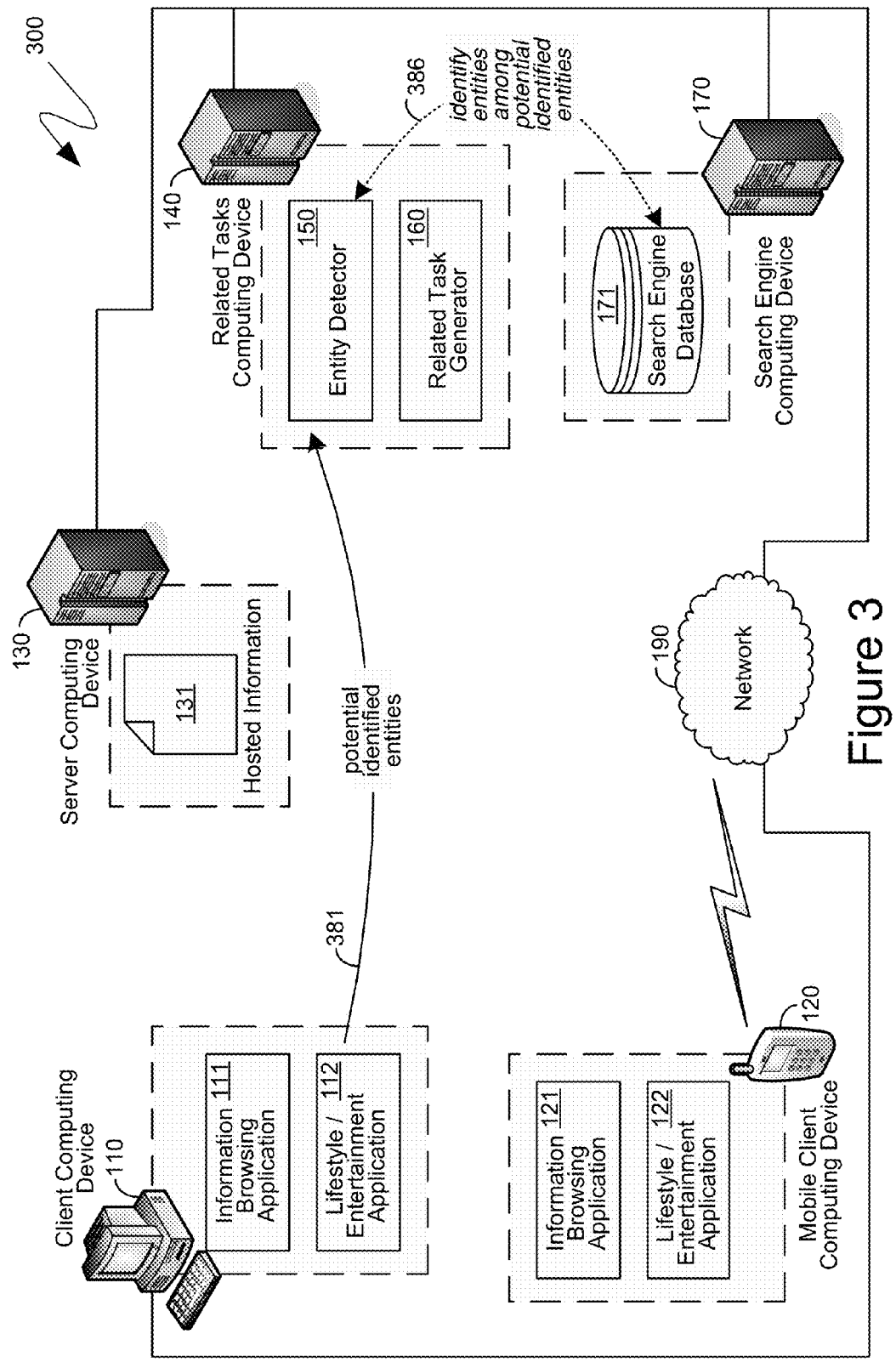
FIG. 3 is a block diagram of an exemplary network of computing devices exchanging communications for identifying entities among information that comprises defined potential entities.

Turning to FIG. 3, the system 300 shown therein illustrates one exemplary embodiment where such an application program, in the form of the lifestyle/entertainment application 112, can provide those potential identified entities to the entity detector 150 via the communication 381 as shown. The lifestyle/entertainment application 112, and the lifestyle/entertainment application 122, can be any one of a music playback application, a video playback application, gaming applications, shopping or consumer applications, tourist or guide applications, and other like applications. For example, if the lifestyle/entertainment application 112 was a music playback application, then the potential identified entities provided, via the communication 381, from such an application to the entity detector 150, can include entities such as the song that is currently being played back, the singer or band that recorded song, the name of the album on which the song was released, and other like information. Such information is termed "potential identified entities" because it represents a discrete set of information that is likely to comprise entities that would be meaningful to the user within the context of the lifestyle/entertainment application 112, as opposed to an open set of information such as, for example, the lyrics of the song, that is less likely to comprise entities that would be meaningful to the user within the context of lifestyle/entertainment application 112.

Upon receiving the potential identified entities, via the communication 381, the entity detector 150 can, again, reference the search engine database 171 to determine whether any one or more of the potential identified entities is, in fact, an entity, as illustrated by the action 386. For example, as indicated previously, in one embodiment the entity detector 150 can, in essence, perform searches, utilizing the search engine database 171, for each of the potential identified entities so as to determine which search results would be deemed to be responsive to a query comprising that potential identified entity. Those potential identified entities for which discrete, objective search results are returned can then be identified, by the entity detector 150, as entities. For example, the name of the artist that recorded the song may well be an entity, as determined by the entity detector 150, as could the name of the album. Conversely, as another example, the name of the song may turn out to not necessarily be an entity, if, for example, the responsive search results reference the song only tangentially, as opposed to, for example, providing detailed information about the song. By contrast, the name of the artist could be determined to be an entity, by the entity detector 150, because the search engine database 171 comprises identifications of discrete, objective information, available in the network 190, about that artist, including, for example, an online encyclopedia entry about the artist, that artist's own personal webpage, or even webpages through which users could purchase tickets to upcoming shows featuring that artist as a performer.

Figure 4:
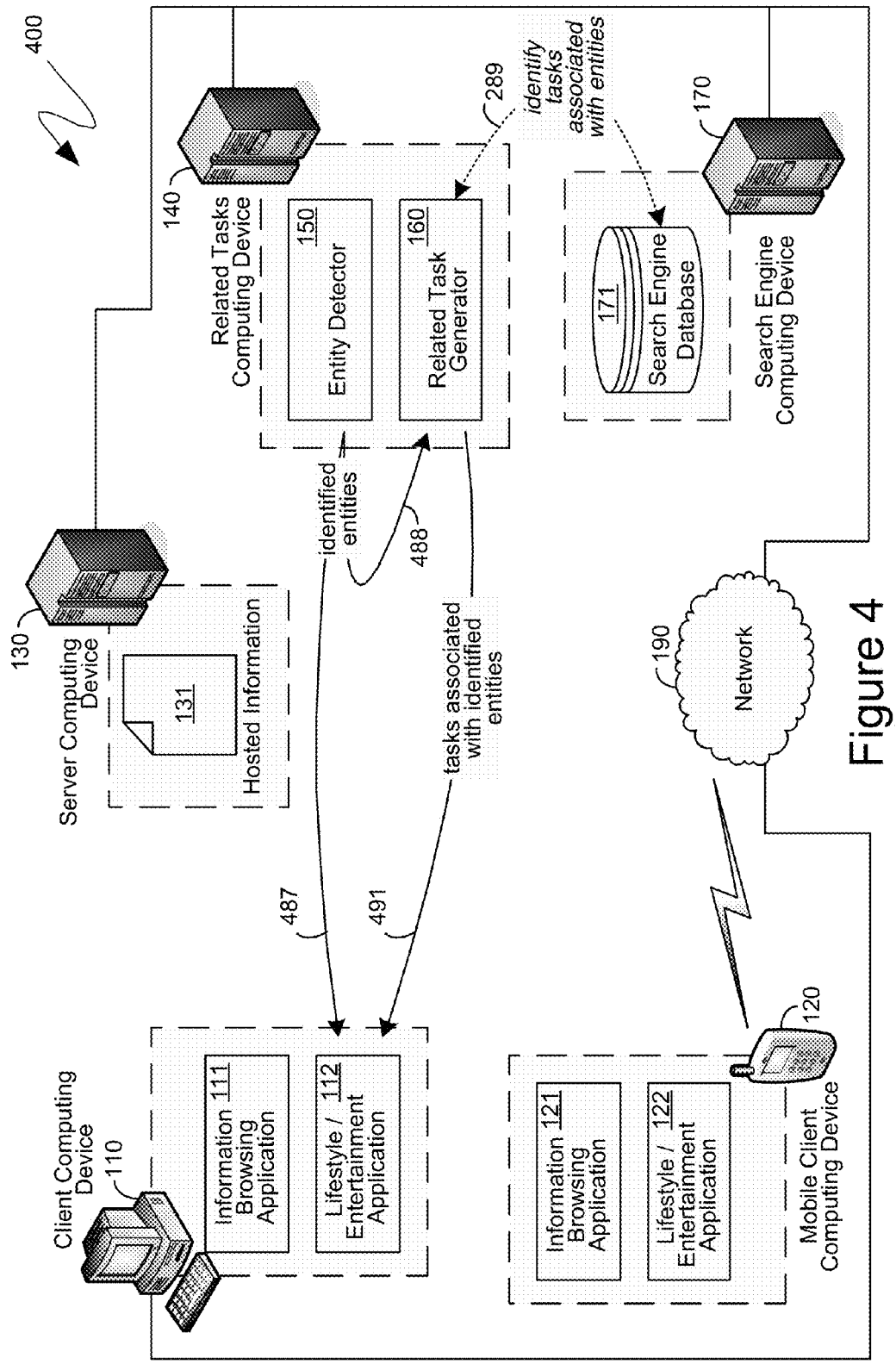
FIG. 4 is a block diagram of an exemplary network of computing devices exchanging communications for providing identified entities and associated tasks to a lifestyle/entertainment application.

Turning to FIG. 4, the system 400 shown therein can be provided with identified entities and tasks related to those identified entities. Analogously to that described in detail above, the entity detector 150, once it has identified specific entities from among the potential entities that were provided to it by the lifestyle/entertainment application 112, can communicate those identified entities to the related task generator 160, such as is illustrated by the communication 488. As indicated previously, in an embodiment where the entity detector 150 and the related task generator 160 are co-located processes, or part of the same process, the communication 488 need be nothing more than intra-process communication, such as the exchange of variables or pointers to memory locations.

Once the related task generator 160 has received the identified entities from the entity detector 150, it can reference the search engine database 171 to identify tasks associated with those entities. As indicated previously, in one embodiment, the related task generator 160 can perform searches, using the search engine database 171, with the identified entities as the search terms, in a manner analogous to that performed by the entity detector 150. However, when the related task generator 160 utilizes the search engine database 171 to identify tasks related to the identified entities, as illustrated by the action 289, the related task generator 160 can look for specific types of search results so as to better quantify the tasks related to those identified entities. For example, returning to the above example of a musical artist as an identified entity, the related task generator 160 can identify information available via the network 190 that can enable users to purchase other albums or songs from that same artist, or purchase tickets to upcoming performances. Such related tasks can be of an actionable type, where the user can be provided with the opportunity to perform further actions that can benefit the user, such as purchasing actions. Related tasks can also be of an informational type, where the user can simply be provided with additional information that can benefit the user, again without the user having to explicitly search for such information. Such informational type related tasks can include the above referenced example of an online encyclopedia entry about the artist, or the artist's own webpage.

Once the related task generator 160 has identified tasks, with reference to the search engine database 171, that are related to the entities identified by the entity detector 150, the related task generator 160 can transmit those related tasks to the lifestyle/entertainment application 112, as illustrated by the communication 491. In addition, the entity detector 150 can, itself, have transmitted the entities it identified to the lifestyle/entertainment application 112, as illustrated by the communication 487. As will be recognized by those skilled in the art, while communications 487 and 491 are illustrated as separate communications, the information contained therein can be transmitted via a single communication.

Once the lifestyle/entertainment application 112 receives the information from the entity detector 150 and the related task generator 160, it can flag at least some of the identified entities so as to prompt the user that there may be additional information, in the form of related tasks, that is associated with those identified entities. In one embodiment, the lifestyle/entertainment application 112 can choose which of the entities identified by the entity detector 150 to present to the user. In an alternative embodiment, the lifestyle/entertainment application 112 can present all of the entities identified by the entity detector 150 since, as indicated previously, the entities identified by the entity detector 150 were from among the potential entities originally transmitted by the lifestyle/entertainment application 112 and, in such an embodiment, the lifestyle/entertainment application 112 need not transmit any potential entities for which it would not display further information to the user such as, for example, if the user had specifically requested that such additional information, in the form of related tasks, not be displayed.

Similarly, in one embodiment, the lifestyle/entertainment application 112 can select which of the related tasks to display to the user for those entities which the lifestyle/entertainment application 112 has decided to flag for the user. Such a selection can be based at least in part upon metadata that can be provided by the related task generator 160 which, as indicated previously, can include an indication of the confidence that the task identified by the related task generator is, in fact, related to the entity with which it is associated, an indication of the strength of that relationship, an indication of the relative importance of such a related task, and other metadata such as, for example, location and time metadata. For example, the related task generator 160 can have identified, as a task related to the musical artist entity in the above example, the purchasing of tickets to upcoming performances by that artist. Such a related task can have metadata associated with it that can identify the geographic location relevant to such a task such as, for example, the geographic location at which those upcoming performances will be held. The lifestyle/entertainment application 112 can then compare the geographic location of the client computing device 110 to the geographic locations of these future performances to determine whether those related tasks should be presented to the user of the client computing device 110. For example, if the client computing device 110 is located on the west coast of the United States, and the upcoming performances for which the related task generator 160 has identified ticket purchases as a related task are all located on the east coast of the United States, then the lifestyle/entertainment application 112 can determine that such related tasks need not be presented to the user, since they would be of no consequence to the user given that user's current location. While the above example was provided within the context of the lifestyle/entertainment application 112 executing on the client computing device 110, it can be more applicable to the lifestyle/entertainment application 122 executing on the mobile client computing device 120 since, as will be recognized by those skilled in the art, many mobile client computing devices, such as the mobile client computing device 120, comprise global positioning sensors or other like geographic position determining hardware by which their location can be identified accurately, and such mechanisms can be utilized by the lifestyle/entertainment application 122, executing on such a mobile client computing device 120, to provide more accurate geographic filtering of, for example, related tasks.

In another embodiment, geographic location of a client computing device, a local time, or other like user-specific information can be provided proactively by the client computing device to the entity detector 150 and related task generator 160. For example, if the mobile client computing device 120 was executing a lifestyle/entertainment application 122 in the form of a tourist application that provided information regarding nearby landmarks and other tourist attractions to users, that tourist application could communicate, to the entity detector 150, not only potential identified entities, such as the landmarks and tourist attractions, but also the location of the mobile client computing device 120 which can, itself, be utilized by the entity detector 150 to perform a search, utilizing the search engine database 171, and identify other entities that may be of interest to a user of such a tourist application, and which may not have otherwise been presented, by that tourist application, to the user. As another example, if the mobile client computing device 120 was executing a lifestyle/entertainment application 122 in the form of a shopping application that provided information regarding places to shop and current special offers, such a shopping application could communicate, to the entity detector 150, not only potential identified entities, such as the retail outlets identified by the shopping application, but could also provide information specific to the user of the mobile client computing device 120, such as, for example, the local time at the location of that user. The entity detector 150 can provide such information to the related task generator 160 and the related task generator 160 can indicate, with a higher time sensitivity metadata, those tasks related to the entities identified by the entity detector, such as, in the present example, the retail outlets, that have a higher time sensitivity such as, for example, sales that may be ending within the next few hours.

Figure 5:
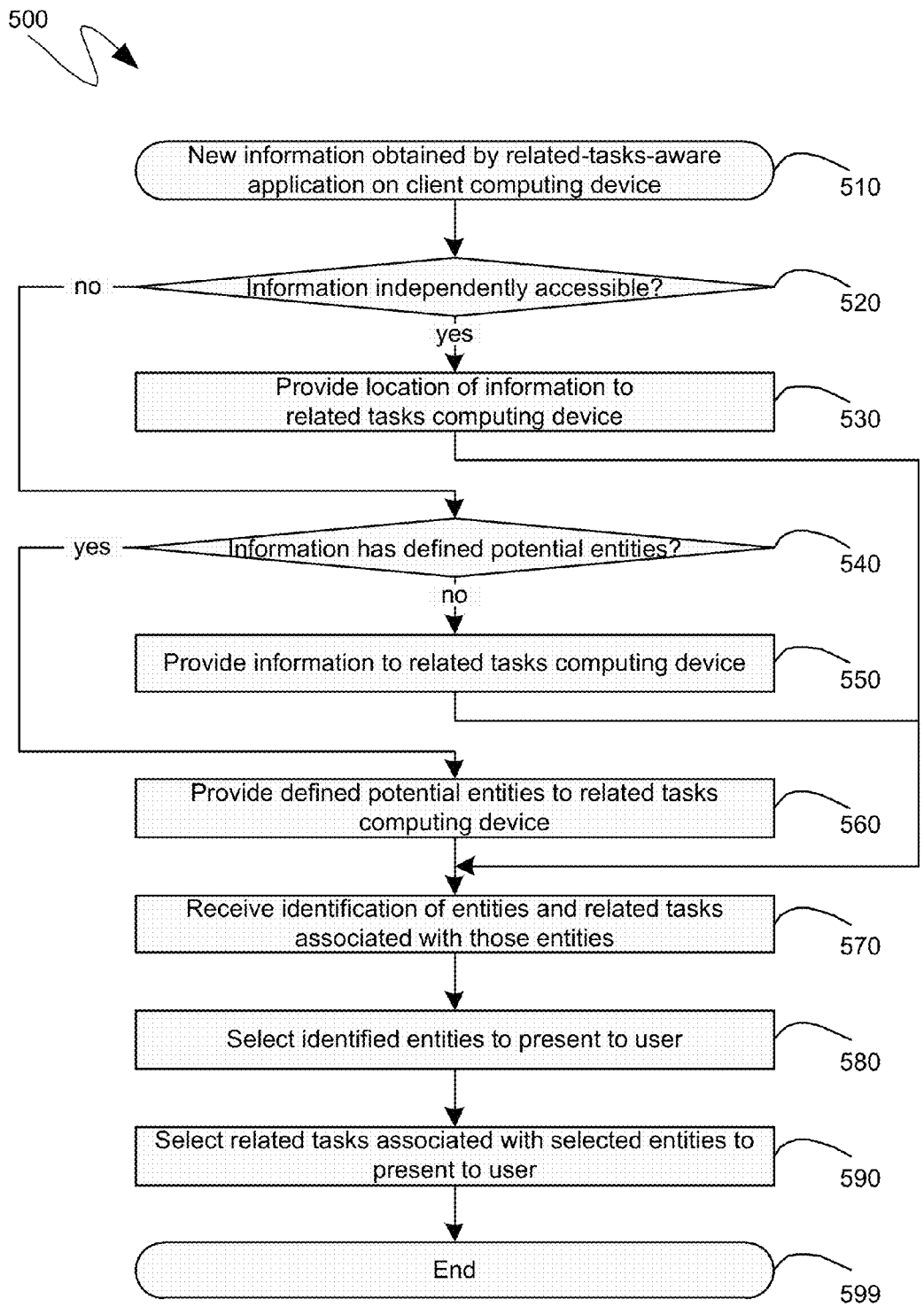
FIG. 5 is a flow diagram of an exemplary operation of an application program receiving and presenting identified entities and related tasks.

Turning to FIG. 5, the flow diagram 500 shown therein illustrates an exemplary series of steps that can be performed by application programs that can utilize services provided by, for example, a related tasks computing device, such as the related tasks computing device 140 illustrated in the prior Figures, to proactively deliver related tasks for identified entities within the context of those application programs. Initially, as illustrated by step 510, new information can be obtained by a related-tasks-aware application on a client computing device. Such a related-tasks-aware application is an application executing on a client computing device that includes the capability to obtain, and present to a user, related tasks that are associated with identified entities within the context of that related-tasks-aware application. For example, the information browsing applications and lifestyle/entertainment applications that were described in detail above are all related-tasks-aware applications as that term is utilized herein. The new information that is obtained by the related-tasks-aware application on the client computing device at step 510 can include a new webpage that the application was directed to by its user, a new e-book that was opened up by the user, a new song or video that was selected by the user, a new retail outlet near which the user passed while executing the application on their mobile client computing device, or other like new information.

Subsequently, at step 520, a determination can be made as to whether this new information is independently accessible. If the information is independently accessible then, in one embodiment, the application need only provide a pointer to such new information to the related tasks computing device, such as is illustrated by the step 530. Alternatively, in another embodiment, the application can still provide the new information directly to the related tasks computing device even though it is independently accessible, although, as will be recognized by those skilled in the art, such an embodiment can be less efficient since it requires the transmission of a greater amount of data through network communications. Alternatively, if the information is not independently accessible, as determined by step 520, processing can proceed to step 540 where a further determination can be made as to whether the information has defined potential entities.

If, at step 540, it is determined that the information does not have defined potential entities then, since such information is not independently accessible and it does not have defined potential entities, the information can provided wholesale to the related tasks computing device, as illustrated by step 550. Conversely, if, at step 540, it is determined that the information does have defined potential entities, then processing can proceed to step 560 and those defined potential entities can be provided to the related tasks computing device.

In response to the provision of information, including the provision of the location of new information at step 530, the provision of the information wholesale at step 550, or the provision of only defined potential entities from the information at step 560, processing can proceed to step 570, where identification of entities and tasks that are related to those entities can be received. Subsequently, at step 580, one or more of those identified entities that were received at step 570 can be selected for presentation to the user. As indicated previously, in one embodiment, the selection of identified entities to be presented to the user can be based on user interface criteria such as, for example, the number of entities that can be presented to a user without distracting the user. In another embodiment, the selection of entities to be presented to the user can be based on metadata associated with the entities and their related tasks, which can also be received at step 570. As indicated previously, such metadata can include quantifications of a confidence level regarding the relation between the tasks and the entities to which they are related, quantifications of a relationship level between the tasks and the entities to which they are related, a quantification of the relative importance of individual entities and tasks associated with those entities, and other like metadata.

Once one or more identified entities are selected for presentation to the user, at step 580, processing can proceed to step 590 at which point one or more tasks that are related to those selected identified entities can themselves be selected for presentation to the user. As indicated previously, such a selection can be based on metadata associated with the related tasks, which can also be received at step 570. For example, such metadata can indicate a geographic aspect to the related tasks such as, for example, the purchase of tickets to the performance of an artist in a particular geographic area. The selection, at step 590 of such related tasks can, thereby, be based on whether the user of the application is geographically located within the same region as that identified related task. Other metadata can include the above described quantification of confidence levels and relationship levels which can be utilized to sort the related tasks such that only related tasks having high confidence levels or high relationship levels are selected. In one embodiment, such a selection can be based on a threshold level that can be predetermined, while, in an alternative embodiment, such a selection can be based on a dynamic threshold that can be based on the levels associated with the specific related tasks from among which the application can choose. Having proactively provided to the user information in the form of identified entities and related tasks associated with those entities, the relevant processing can then end at step 599.

Figure 6:
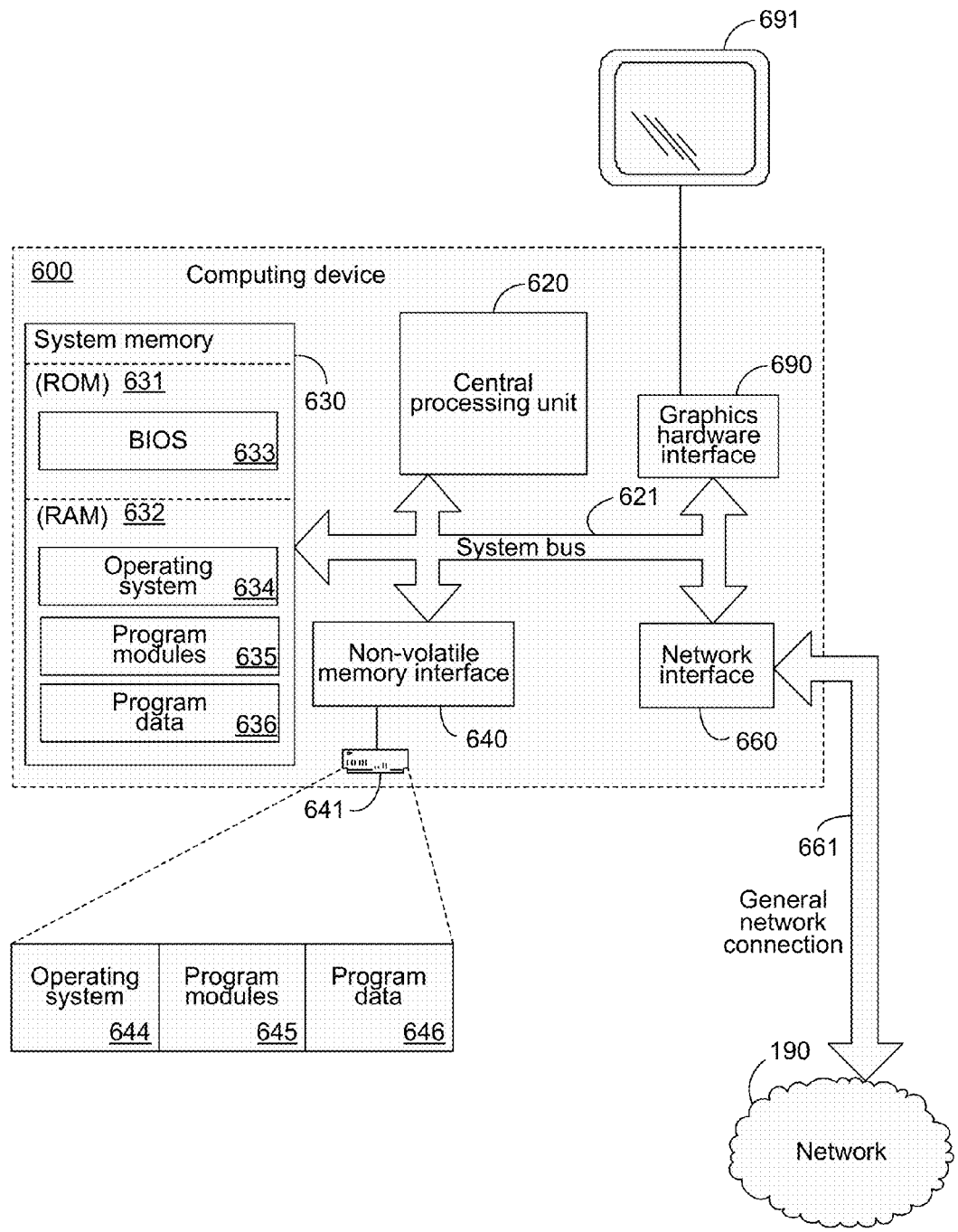
FIG. 6 is a block diagram of an exemplary computing device.

Turning to FIG. 6, an exemplary computing device 600 is illustrated. The exemplary computing device 600 can be any one or more of the client computing device 110 and the server computing devices 120 and 130 illustrated in the previously referenced Figures, whose operations were described in detail above. Similarly, the exemplary computing device 600 can be a computing device that can be executing one or more processes that can represent the client computing device 110 and the server computing devices 120 and 130 illustrated in the previously referenced Figures, such as, for example, by executing one or more processes that create virtual computing environments that can provide for the operations detailed above in connection with the client computing device 110 and the server computing devices 120 and 130. The exemplary computing device 600 of FIG. 6 can include, but is not limited to, one or more central processing units (CPUs) 620, a system memory 630, that can include RAM 632, and a system bus 621 that couples various system components including the system memory to the processing unit 620. The system bus 621 may be any of several types of bus structures including a memory bus or memory controller, a peripheral bus, and a local bus using any of a variety of bus architectures. The computing device 600 can optionally include graphics hardware, such as for the display of visual user interfaces, including, but not limited to, a graphics hardware interface 690 and a display device 691. Depending on the specific physical implementation, one or more of the CPUs 620, the system memory 630 and other components of the computing device 600 can be physically co-located, such as on a single chip. In such a case, some or all of the system bus 621 can be nothing more than silicon pathways within a single chip structure and its illustration in FIG. 6 can be nothing more than notational convenience for the purpose of illustration.

The computing device 600 also typically includes computer readable media, which can include any available media that can be accessed by computing device 600 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 600. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and the aforementioned RAM 632. A basic input/output system 633 (BIOS), containing the basic routines that help to transfer information between elements within computing device 600, such as during start-up, is typically stored in ROM 631. RAM 632 typically contains data and/or program modules that are immediately accessible to and/or presently being operated on by processing unit 620. By way of example, and not limitation, FIG. 6 illustrates the operating system 634 along with other program modules 635, and program data 636.

The computing device 600 may also include other removable/non-removable, volatile/nonvolatile computer storage media. By way of example only, FIG. 6 illustrates the hard disk drive 641 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640.

The drives and their associated computer storage media discussed above and illustrated in FIG. 6, provide storage of computer readable instructions, data structures, program modules and other data for the computing device 600. In FIG. 6, for example, hard disk drive 641 is illustrated as storing operating system 644, other program modules 645, and program data 646. Note that these components can either be the same as or different from operating system 634, other program modules 635 and program data 636. Operating system 644, other program modules 645 and program data 646 are given different numbers hereto illustrate that, at a minimum, they are different copies.

The computing device 600 can operate in a networked environment using logical connections to one or more remote computers. The computing device 600 is illustrated as being connected to the general network connection 661 through a network interface or adapter 660 which is, in turn, connected to the system bus 621. In a networked environment, program modules depicted relative to the computing device 600, or portions or peripherals thereof, may be stored in the memory of one or more other computing devices that are communicatively coupled to the computing device 600 through the general network connection 661. It will be appreciated that the network connections shown are exemplary and other means of establishing a communications link between computing devices may be used.

As can be seen from the above descriptions, mechanisms for proactively providing related tasks for identified entities have been enumerated. In view of the many possible variations of the subject matter described herein, we claim as our invention all such embodiments as may come within the scope of the following claims and equivalents thereto.

We claim:

1. One or more computer-readable memory comprising computer-executable instructions for proactively presenting tasks related to identified entities, the computer-executable instructions, when executed by one or more processing units of a computing device, causing the computing device to perform steps comprising:
selecting, from among information presented to a user through an application context, defined subsets of the information that reference potential entities;
receiving identified entities that were identified from the potential entities based on a search engine database;

receiving the related tasks that were identified as being related to specific, individual ones of the identified entities based on the search engine database;

receiving metadata quantifying a relationship between a particular identified entity and its related tasks;

selecting, from among the identified entities, based on the related tasks' metadata, a selected subset of identified entities, the selected subset being less than all of the identified entities;

selecting, from among the related tasks, at least one task related to each entity in the selected subset of identified entities;

generating an indicator, within the application context, for each entity in the selected subset of identified entities; and generating a presentation, within the application context, of the selected at least one related task if a user action is directed towards the generated indicator.

2. The computer-readable memory of claim 1, wherein the metadata further specifies an applicable geographic location of an associated related task; and wherein further the computer-executable instructions for selecting the at least one related task comprise computer-executable instructions for obtaining a current geographic location of the user, comparing the obtained current geographic location of the user to the applicable geographic location of the associated related task, and determining whether to select the associated related task based on the comparing.

3. The computer-readable memory of claim 1, wherein the related tasks comprise exclusively actionable tasks.

4. The computer-readable memory of claim 1, comprising further computer-executable instructions for obtaining a current geographic location of the user and providing, to the related tasks computing device, the obtained current geographic location of the user.

5. The computer-readable memory of claim 1, wherein the information being presented to the user is a song being played to the user; and wherein further the selected subset of identified entities comprises an artist who performed the song and the selected at least one related task comprises purchasing tickets.

6. The computer-readable memory of claim 1, wherein the related tasks were identified as being related to the specific, individual ones of the identified entities by searching the search engine database for each of the specific, individual ones of the identified entities.

7. The computer-readable memory of claim 1, wherein at least one of the related tasks is a purchase task through which the user can make a purchase associated with the identified entity with which the purchase task is related.

8. A method of proactively presenting tasks related to identified entities, the method comprising the steps of:

selecting, at a computing device, from among information presented to a user through an application context generated by an application executing on the computing device, defined subsets of the information that reference potential entities;

receiving, at the computing device, identified entities that were identified from the potential entities based on a search engine database;

receiving, at the computing device, the related tasks that were identified as being related to specific, individual ones of the identified entities based on the search engine database;

receiving, at the computing device, metadata quantifying a relationship between a particular identified entity and its related tasks;

selecting, at the computing device, from among the identified entities, based on the related tasks' metadata a selected subset of identified entities, the selected subset being less than all of the identified entities;

selecting, at the computing device, from among the related tasks, at least one task related to each entity in the selected subset of identified entities;

generating, on a display device communicationally coupled to the computing device, an indicator, within the application context, for each entity in the selected subset of identified entities; and generating, on the display device, a presentation, within the application context, of the selected at least one related task if a user action is directed towards the generated indicator.

9. The method of claim 8, wherein the metadata further specifies an applicable geographic location of an associated related task; and wherein further the selecting the at least one related task comprises obtaining a current geographic location of the user, comparing the obtained current geographic location of the user to the applicable geographic location of the associated related task, and determining whether to select the associated related task based on the comparing.

10. The method of claim 8, wherein the related tasks comprise exclusively actionable tasks.

11. The method of claim 8, further comprising the steps of obtaining a current geographic location of the user and providing, to the related tasks computing device, the obtained current geographic location of the user.

12. The method of claim 8, wherein the information being presented to the user is a song being played to the user; and wherein further the selected subset of identified entities comprises an artist who performed the song and the selected at least one related task comprises purchasing tickets.

13. The method of claim 8, wherein the related tasks were identified as being related to the specific, individual ones of the identified entities by searching the search engine database for each of the specific, individual ones of the identified entities.

14. The method of claim 8, wherein at least one of the related tasks is a purchase task through which the user can make a purchase associated with the identified entity with which the purchase task is related.

15. A mobile computing device comprising:
geographic position determining hardware;
wireless network interface hardware;
at least one central processing unit; and
one or more computer-readable storage media comprising computer-executable instructions that, when executed by the at least one central processing unit, perform steps comprising:
selecting, from among information presented to a user by the mobile computing device, defined subsets of the information, that reference potential entities;
receiving, via the wireless network hardware interface, identified entities that were identified from the potential entities based on a search engine database;
receiving, via the wireless network hardware interface, the related tasks that were identified as being related to specific, individual ones of the identified entities based on the search engine database;
receiving, via the wireless network hardware interface, metadata quantifying a relationship between a particular identified entity and its related tasks;
selecting, from among the identified entities, based on the related tasks' metadata, a selected subset of identified entities, the selected subset being less than all of the identified entities;

selecting, from among the related tasks, at least one task related to each entity in the selected subset of identified entities;

generating an indicator, within the application context, for each entity in the selected subset of identified entities; and generating a presentation, within the application context, of the selected at least one related task if a user action is directed towards the generated indicator.

16. The mobile computing device of claim 15, wherein the metadata further specifies an applicable geographic location of an associated related task; and wherein further the computer-executable instructions that, when executed by the at least one central processing unit, select the at least one related task comprise further computer-executable instructions that, when executed by the at least one central processing unit, obtain a current geographic location of the user, compare the obtained current geographic location of the user to the applicable geographic location of the associated related task, and determine whether to select the associated related task based on the comparing.

17. The mobile computing device of claim 15, wherein the one or more computer-readable storage media comprise further computer-executable instructions that, when executed by the at least one central processing unit, obtain a current geographic location of the user and provide, to the related tasks computing device, the obtained current geographic location of the user.

18. The mobile computing device of claim 15, wherein the information being presented to the user is a song being played to the user; and wherein further the selected subset of identified entities comprises an artist who performed the song and the selected at least one related task comprises purchasing tickets.

19. The mobile computing device of claim 15, wherein the related tasks were identified as being related to the specific, individual ones of the identified entities by searching the search engine database for each of the specific, individual ones of the identified entities.

20. The mobile computing device of claim 15, wherein at least one of the related tasks is a purchase task through which the user can make a purchase associated with the identified entity with which the purchase task is related.

* * * * *